UNITED STATES PATENT OFFICE.

THOMAS KEMP GAINES, OF BURNET, TEXAS.

ARTIFICIAL STONE.

SPECIFICATION forming part of Letters Patent No. 726,278, dated April 28, 1903.

Application filed September 22, 1902. Serial No. 124,437. (No specimens.)

*To all whom it may concern:*

Be it known that I, THOMAS KEMP GAINES, a citizen of the United States, residing at Burnet, in the county of Burnet and State of Texas, have invented certain new and useful Improvements in Artificial Stone; and I do hereby declare the following to be a full, clear, and exact description of the invention, such as will enable others skilled in the art to which it appertains to make and use the same.

This invention relates to artificial stone suitable for tombstones, monuments, and for building or other purposes.

The object of the invention is to produce an artificial stone of great durability and hardness which is formed in a manner permitting it to be marked or inscribed and molded while in a soft state and which will cost much less than natural stone or marble.

In the manufacture of the stone I first make a mixture of Portland cement and flint or glass sand, preferably underground sand, free from loam or dirt. If the sand is fine, I use one-third cement and two-thirds sand, by volume. If the sand is coarse, I use one-fourth cement and three-fourths sand. These ingredients are mixed thoroughly while dry and then the mixture is run through a fine sieve. It is then mixed to a mortar with boiling soft water and is ready to be run into the molds. The mortar is placed in the molds of desired form and allowed to stand from one to two hours and then pressed with considerable pressure for five or ten minutes, after which the molds are removed and the stone is in fit condition to receive inscriptions or designs and to be dressed perfectly smooth with a trowel. The stone is then whitened and indurated by the following means: I make a solution of rock-alum, white vinegar, gum, and zinc oxid dissolved in ammonia-water, equal quantities of each, and add thereto a sufficient quantity of soft water and subject the stone to the action of vapor arising from the mixture or solution for from three to six hours, according to the mass of the stone. The steaming operation is performed in an air-tight vat, in which the stone and the said solution are placed, or the solution may be put on the stone with a brush and then steamed. By the application of heat the steam and vapor impregnate the rock and whiten and harden it. When this operation is finished, the stone is set out to cure for a few days and is then ready to be used for the purpose for which it was intended.

By test and experiment I find that the artificial stone so formed will stand great changes of temperature without cracking, is not affected by hot or cold water, and is of great hardness and durability and becomes harder with increasing age. It is as white as white marble and half to three-quarters cheaper than either marble or granite.

The steaming operation above described is done in a closed vat, whereby when the steam is generated the stone receives the pressure thereof, whereby the vapors of the ingredients of the solution are forced into the stone.

Having thus described the invention, what I claim as new, and desire to secure by Letters Patent, is—

An artificial stone comprising a mixture of sand and cement impregnated and combined with alum, an acid, gum and zinc oxid, substantially as described.

In testimony whereof I affix my signature in presence of two witnesses.

THOMAS KEMP GAINES.

Witnesses:
C. D. HARRELL,
C. C. BURNS.